United States Patent
Vt et al.

(10) Patent No.: US 12,265,621 B2
(45) Date of Patent: Apr. 1, 2025

(54) RANSOMWARE ACTIVITY DETECTION AND DATA PROTECTION

(71) Applicant: Dell Products, L.P., Hopkinton, MA (US)

(72) Inventors: Mohammed Asher Vt, Bangalore (IN); Ramesh Doddaiah, Westborough, MA (US); Sandeep Chandrashekhara, Shrewsbury, MA (US); Malak Alshawabkeh, Franklin, MA (US)

(73) Assignee: Dell Products, L.P., Hopkinton, MA (US)

( * ) Notice: Subject to any disclaimer, the term of this patent is extended or adjusted under 35 U.S.C. 154(b) by 282 days.

(21) Appl. No.: 18/186,279

(22) Filed: Mar. 20, 2023

(65) Prior Publication Data

US 2024/0320340 A1    Sep. 26, 2024

(51) Int. Cl.
*G06F 21/56* (2013.01)

(52) U.S. Cl.
CPC .......... *G06F 21/568* (2013.01); *G06F 21/565* (2013.01)

(58) Field of Classification Search
USPC ........................................................ 726/22
See application file for complete search history.

(56) References Cited

U.S. PATENT DOCUMENTS

| | | | | |
|---|---|---|---|---|
| 9,836,243 B1* | 12/2017 | Chanler | ............. | G11C 16/3495 |
| 10,146,648 B1* | 12/2018 | Vokaliga | ............. | G06F 11/2058 |
| 11,487,715 B1* | 11/2022 | Karr | ......................... | G06F 3/067 |
| 2022/0027472 A1* | 1/2022 | Golden | ................... | G06F 21/78 |
| 2022/0100380 A1* | 3/2022 | Barber | .................... | G06F 3/065 |
| 2022/0138105 A1* | 5/2022 | Bora | .................... | G06F 12/0871 |
| | | | | 711/154 |
| 2023/0229764 A1* | 7/2023 | Vohra | .................... | G06F 21/568 |
| 2024/0232020 A1* | 7/2024 | Shveidel | ............. | G06F 11/1417 |

FOREIGN PATENT DOCUMENTS

EP    3683705 A1 *  7/2020   .......... G06F 11/1456

* cited by examiner

*Primary Examiner* — Sakinah White Taylor
(74) *Attorney, Agent, or Firm* — Anderson Gorecki LLP

(57) ABSTRACT

Ransomware activity detection and data protection is implemented by a remote R2 storage array on an asynchronous remote data replication facility, on which data from a primary R1 storage array is replicated to the remote storage array. Write operations on storage volumes in a remote data replication group are collected in a capture cycle on the primary storage array, along with IO pattern metadata describing both read and write operations on the storage volumes. At the end of the capture cycle, the update and metadata is transmitted to the remote storage array. The remote storage array receives the update and metadata and temporarily stores the update prior to applying it to its copy of the storage volumes. Ransomware anomaly detection is implemented using the update and metadata, and if ransomware activity is detected, the data on the remote R2 storage array is protected, and the update is not applied.

20 Claims, 5 Drawing Sheets

RANSOMWARE ACTIVITY DETECTION AND DATA PROTECTION

FIELD

This disclosure relates to computing systems and related devices and methods, and, more particularly, to ransomware activity detection and data protection by a remote storage array on an asynchronous remote data replication facility.

SUMMARY

The following Summary and the Abstract set forth at the end of this document are provided herein to introduce some concepts discussed in the Detailed Description below. The Summary and Abstract sections are not comprehensive and are not intended to delineate the scope of protectable subject matter, which is set forth by the claims presented below.

All examples and features mentioned below can be combined in any technically possible way.

According to some embodiments, ransomware activity detection and data protection is implemented by a remote R2 storage array on an asynchronous remote data replication facility, on which data from a primary R1 storage array is replicated to the remote R2 storage array. Write operations on storage devices in a remote data replication group are collected in a capture cycle on the primary R1 storage array, along with IO pattern metadata describing both read and write operations and relative order of the read and write operations on the storage devices of the remote data replication group during the capture cycle. At the end of the capture cycle, the primary R1 storage array implements a transmit cycle, during which the primary R1 storage array transmits the data that was written to the devices of the remote data replication group to the remote R2 storage array, and also transmits the IO pattern metadata to the remote R2 storage array.

The remote R2 storage array receives the data that was written to the devices of the remote data replication group 250 during a receive cycle, along with the IO pattern metadata. During the receive cycle, the remote R2 storage array temporarily stores the received data and performs ransomware analysis on the received data and IO metadata prior to applying the received write operations to the backup copy of the data maintained by the remote R2 storage array. In instances where a possible ransomware attack is detected on the remote R2 storage array, the existing backup copy of the data at the remote R2 storage array is protected, such as by taking a snapshot of the existing backup copy of the data, and the data that was received during the receive cycle is not applied to the backup data. In instances where it is determined that none of the host write operations are likely associated with ransomware activity, the host write operations contained in the remote data replication update are applied to the second set of storage volumes implementing the backup copy of the data at the remote R2 storage array.

By implementing ransomware activity detection and data protection by the remote R2 storage array on an asynchronous remote data replication facility, it is possible to implement ransomware detection without using any of the CPU resources of the primary R1 storage array. As such, the ransomware detection processing does not affect the primary R1 storage array's ability to process host IO operations, thus maximizing the number of input/output operations per second (IOPS) and Response Time (RT) of the primary R1 storage array.

By implementing ransomware activity on the remote R2 storage array on the asynchronous remote data replication facility, the remote R2 storage array is able to perform ransomware detection processes on a batch of previous host IO operations prior to applying the host write operations to the host data on the remote R2 storage array. In instances where a ransomware attack is occurring, this enables the remote R2 storage array to selectively not apply the write IO operations and undo the damage caused by the ransomware attack, by maintaining a copy of the previous host data and restoring the portions of the data affected by the ransomware attack back from the remote R2 storage array to the primary R1 storage array. By providing the ability to go back in time, to retroactively restore data that was previously corrupted by the ransomware attack on the primary R1 storage array, it is possible to minimize the amount of damage inflicted at the onset of a ransomware attack.

In some embodiments, a method of detecting ransomware activity, includes implementing an asynchronous remote data replication facility between a primary storage array and a remote storage array, in which data contained in a first set of storage volumes of a first remote data replication storage group at the primary storage array is copied in an asynchronous manner from the primary storage array to the remote storage array to replicate the data in a second set of storage volumes of a second remote data replication storage group at the remote storage array, receiving host read and write operations on the first set of storage volumes by the primary storage array during a capture cycle, generating a remote data replication update including all of the host write operations on the first set of storage volumes during the capture cycle, generating a host IO metadata update describing all of the host write operations and all of the host read operations on the first set of storage volumes during the capture cycle, and transmitting the remote data replication update and the host IO metadata update at the end of the capture cycle to the remote storage array. The method also includes receiving the remote data replication update and the host IO metadata update during a receive cycle at the remote storage array, temporarily storing the remote data replication update without applying any of the host write operations contained in the remote data replication update to the second set of storage volumes and, while temporarily storing the remote data replication update, performing ransomware anomaly detection using the remote data replication update and the host IO metadata update to determine if any of the host write operations are likely associated with ransomware activity. In response to a determination that one or more of the host write operations is likely associated with ransomware activity, protecting the data contained in the second set of storage volumes. In response to a determination that none of the host write operations are likely associated with ransomware activity, applying the host write operations contained in the remote data replication update to the second set of storage volumes.

In some embodiments, protecting the data contained in the second set of storage volumes includes creating a point-in-time copy of each storage volume of the second set of storage volumes. In some embodiments, protecting the data contained in the second set of storage volumes includes not applying the host write operations contained in the remote data replication update to the second set of storage volumes.

In some embodiments, protecting the data contained in the second set of storage volumes includes not applying the host write operations contained in the remote data replication update to the second set of storage volumes, generating a notification indicating that the ransomware anomaly detection identified one or more of the host write operations as being likely associated with ransomware activity, and waiting for a response containing a determination that the one or more of the host write operations is actually associated with ransomware activity or is not actually associated with ransomware activity.

In some embodiments, in response to a determination that the one or more of the host write operations is actually associated with ransomware activity, the method includes restoring data from the second set of storage volumes to the first set of storage volumes.

In some embodiments, in response to a determination that the one or more of the host write operations is not actually associated with ransomware activity, the method includes applying the host write operations contained in the remote data replication update to the second set of storage volumes.

In some embodiments, performing ransomware anomaly detection using the remote data replication update and the host IO metadata update is implemented at the remote storage array to determine by the remote storage array if any of the host write operations are likely associated with ransomware activity prior to applying the remote data replication update to the second set of storage volumes on the remote storage array. In some embodiments, the host IO metadata update includes information describing the size of the host read operations. In some embodiments, the host IO metadata update includes IO pattern metadata describing an order of the host read operations relative to the host write operations.

In some embodiments, performing ransomware anomaly detection on the remote storage array includes, for each extent of each of the second set of storage volumes, creating a multivariate time series for the extent including data values for a plurality of statistics over a preceding time window, creating a current set of data values for the plurality of statistics from the remote data replication update and the host IO metadata update, determining current outlier values by comparing the current set of data values with predicted data values generated from the multivariate time series, weighting the current outlier values to create weighted current outlier values, combining the weighted current outlier values, and determining from the combined weighted current outlier values if the host write operations and host read operations on the extent are likely associated with ransomware activity.

In some embodiments, a system for detecting ransomware activity, includes one or more processors and one or more storage devices storing instructions that are operable, when executed by the one or more processors, to cause the one or more processors to perform operations including implementing an asynchronous remote data replication facility between a primary storage array and a remote storage array, in which data contained in a first set of storage volumes of a first remote data replication storage group at the primary storage array is copied in an asynchronous manner from the primary storage array to the remote storage array to replicate the data in a second set of storage volumes of a second remote data replication storage group at the remote storage array, receiving host read and write operations on the first set of storage volumes by the primary storage array during a capture cycle, generating a remote data replication update including all of the host write operations on the first set of storage volumes during the capture cycle, generating a host IO metadata update describing all of the host write operations and all of the host read operations on the first set of storage volumes during the capture cycle, and transmitting the remote data replication update and the host IO metadata update at the end of the capture cycle to the remote storage array. The operations further include receiving the remote data replication update and the host IO metadata update during a receive cycle at the remote storage array, temporarily storing the remote data replication update without applying any of the host write operations contained in the remote data replication update to the second set of storage volumes, and while temporarily storing the remote data replication update, performing ransomware anomaly detection using the remote data replication update and the host IO metadata update to determine if any of the host write operations are likely associated with ransomware activity. In response to a determination that one or more of the host write operations is likely associated with ransomware activity, protecting the data contained in the second set of storage volumes. In response to a determination that none of the host write operations are likely associated with ransomware activity, applying the host write operations contained in the remote data replication update to the second set of storage volumes.

In some embodiments, protecting the data contained in the second set of storage volumes includes creating a point-in-time copy of each storage volume of the second set of storage volumes. In some embodiments, protecting the data contained in the second set of storage volumes includes not applying the host write operations contained in the remote data replication update to the second set of storage volumes.

In some embodiments, protecting the data contained in the second set of storage volumes includes not applying the host write operations contained in the remote data replication update to the second set of storage volumes, generating a notification indicating that the ransomware anomaly detection identified one or more of the host write operations as being likely associated with ransomware activity, and waiting for a response containing a determination that the one or more of the host write operations is actually associated with ransomware activity or is not actually associated with ransomware activity.

In some embodiments, in response to a determination that the one or more of the host write operations is actually associated with ransomware activity, the operations include restoring data from the second set of storage volumes to the first set of storage volumes.

In some embodiments, in response to a determination that the one or more of the host write operations is not actually associated with ransomware activity, the operations include applying the host write operations contained in the remote data replication update to the second set of storage volumes.

In some embodiments, performing ransomware anomaly detection using the remote data replication update and the host IO metadata update is implemented at the remote storage array to determine by the remote storage array if any of the host write operations are likely associated with ransomware activity prior to applying the remote data replication update to the second set of storage volumes on the remote storage array. In some embodiments, the host IO metadata update includes information describing the size of the host read operations. In some embodiments, the host IO metadata update includes IO pattern metadata describing an order of the host read operations relative to the host write operations.

In some embodiments, performing ransomware anomaly detection on the remote storage array includes, for each extent of each of the second set of storage volumes, creating a multivariate time series for the extent including data values for a plurality of statistics over a preceding time window, creating a current set of data values for the plurality of statistics from the remote data replication update and the host IO metadata update, determining current outlier values by comparing the current set of data values with predicted data values generated from the multivariate time series, weighting the current outlier values to create weighted current outlier values, combining the weighted current outlier values, and determining from the combined weighted current outlier values if the host write operations and host read operations on the extent are likely associated with ransomware activity

DETAILED DESCRIPTION

Aspects of the inventive concepts will be described as being implemented in a storage system 100 connected to a host computer 102. Such implementations should not be viewed as limiting. Those of ordinary skill in the art will recognize that there are a wide variety of implementations of the inventive concepts in view of the teachings of the present disclosure.

Some aspects, features and implementations described herein may include machines such as computers, electronic components, optical components, and processes such as computer-implemented procedures and steps. It will be apparent to those of ordinary skill in the art that the computer-implemented procedures and steps may be stored as computer-executable instructions on a non-transitory tangible computer-readable medium. Furthermore, it will be understood by those of ordinary skill in the art that the computer-executable instructions may be executed on a variety of tangible processor devices, i.e., physical hardware. For ease of exposition, not every step, device or component that may be part of a computer or data storage system is described herein. Those of ordinary skill in the art will recognize such steps, devices, and components in view of the teachings of the present disclosure and the knowledge generally available to those of ordinary skill in the art. The corresponding machines and processes are therefore enabled and within the scope of the disclosure.

The terminology used in this disclosure is intended to be interpreted broadly within the limits of subject matter eligibility. The terms "logical" and "virtual" are used to refer to features that are abstractions of other features, e.g., and without limitation, abstractions of tangible features. The term "physical" is used to refer to tangible features, including but not limited to electronic hardware. For example, multiple virtual computing devices could operate simultaneously on one physical computing device. The term "logic" is used to refer to special purpose physical circuit elements, firmware, and/or software implemented by computer instructions that are stored on a non-transitory tangible computer-readable medium and implemented by multi-purpose tangible processors, and any combinations thereof.

Figure 1:
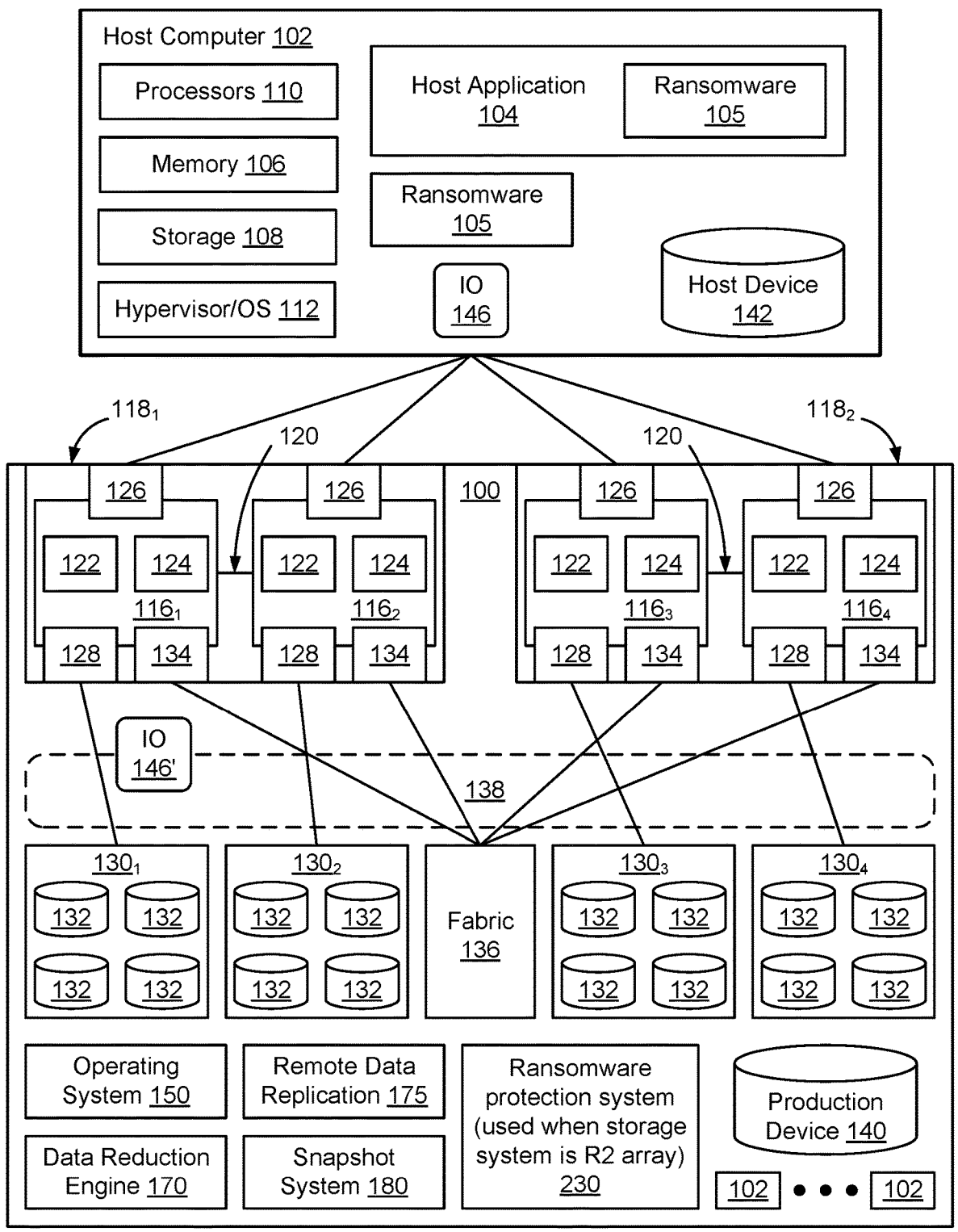
FIG. 1 is a functional block diagram of an example storage system connected to a host computer, according to some embodiments.

FIG. 1 illustrates a storage system 100 and an associated host computer 102, of which there may be many. The storage system 100 provides data storage services for a host application 104, of which there may be more than one instance and type running on the host computer 102. In the illustrated example, the host computer 102 is a server with host volatile memory 106, persistent storage 108, one or more tangible processors 110, and a hypervisor or OS (Operating System) 112. The processors 110 may include one or more multi-core processors that include multiple CPUs (Central Processing Units), GPUs (Graphics Processing Units), and combinations thereof. The host volatile memory 106 may include RAM (Random Access Memory) of any type. The persistent storage 108 may include tangible persistent storage components of one or more technology types, for example and without limitation SSDs (Solid State Drives) and HDDs (Hard Disk Drives) of any type, including but not limited to SCM (Storage Class Memory), EFDs (Enterprise Flash Drives), SATA (Serial Advanced Technology Attachment) drives, and FC (Fibre Channel) drives. The host computer 102 might support multiple virtual hosts running on virtual machines or containers. Although an external host computer 102 is illustrated in FIG. 1, in some embodiments host computer 102 may be implemented as a virtual machine within storage system 100.

The storage system 100 includes a plurality of compute nodes $116_1$-$116_4$, possibly including but not limited to storage servers and specially designed compute engines or storage directors for providing data storage services. In some embodiments, pairs of the compute nodes, e.g. ($116_1$-$116_2$) and ($116_3$-$116_4$), are organized as storage engines 1181 and 1182, respectively, for purposes of facilitating failover between compute nodes 116 within storage system 100. In some embodiments, the paired compute nodes 116 of each storage engine 118 are directly interconnected by communication links 120. In some embodiments, the communication links 120 are implemented as a PCIe NTB. As used herein, the term "storage engine" will refer to a storage engine, such as storage engines 1181 and 1182, which has a pair of (two independent) compute nodes, e.g. ($116_1$-$116_2$) or ($116_3$-$116_4$). A given storage engine 118 is implemented using a single physical enclosure and provides a logical separation between itself and other storage engines 118 of the storage system 100. A given storage system 100 may include one storage engine 118 or multiple storage engines 118.

Each compute node, $116_1$, $116_2$, $116_3$, $116_4$, includes processors 122 and a local volatile memory 124. The processors 122 may include a plurality of multi-core processors of one or more types, e.g., including multiple CPUs, GPUs, and combinations thereof. The local volatile memory 124 may include, for example and without limitation, any type of RAM. Each compute node 116 may also include one or more front-end adapters 126 for communicating with the host computer 102. Each compute node $116_1$-$116_4$ may also include one or more back-end adapters 128 for communicating with respective associated back-end drive arrays $130_1$-$130_4$, thereby enabling access to managed drives 132. A given storage system 100 may include one back-end drive array 130 or multiple back-end drive arrays 130.

In some embodiments, managed drives 132 are storage resources dedicated to providing data storage to storage system 100 or are shared between a set of storage systems 100. Managed drives 132 may be implemented using numerous types of memory technologies for example and without limitation any of the SSDs and HDDs mentioned above. In some embodiments the managed drives 132 are implemented using NVM (Non-Volatile Memory) media technologies, such as NAND-based flash, or higher-performing SCM (Storage Class Memory) media technologies such as 3D XPoint and ReRAM (Resistive RAM). Managed drives 132 may be directly connected to the compute nodes $116_1$-$116_4$, using a PCIe (Peripheral Component Interconnect Express) bus or may be connected to the compute nodes $116_1$-$116_4$, for example, by an IB (InfiniBand) bus or fabric.

In some embodiments, each compute node 116 also includes one or more channel adapters 134 for communicating with other compute nodes 116 directly or via an interconnecting fabric 136. An example interconnecting fabric 136 may be implemented using PCIe (Peripheral Component Interconnect Express) or InfiniBand. Each compute node 116 may allocate a portion or partition of its respective local volatile memory 124 to a virtual shared memory 138 that can be accessed by other compute nodes 116 over the PCIe NTB links.

The storage system 100 maintains data for the host applications 104 running on the host computer 102. For example, host application 104 may write data of host application 104 to the storage system 100 and read data of host application 104 from the storage system 100 in order to perform various functions. Examples of host applications 104 may include but are not limited to file servers, email servers, block servers, and databases.

Logical storage devices are created and presented to the host application 104 for storage of the host application 104 data. For example, as shown in FIG. 1, a production device 140 and a corresponding host device 142 are created to enable the storage system 100 to provide storage services to the host application 104.

The host device 142 is a local (to host computer 102) representation of the production device 140. Multiple host devices 142, associated with different host computers 102, may be local representations of the same production device 140. The host device 142 and the production device 140 are abstraction layers between the managed drives 132 and the host application 104. From the perspective of the host application 104, the host device 142 is a single data storage device having a set of contiguous fixed-size LBAs (Logical Block Addresses) on which data used by the host application 104 resides and can be stored. However, the data used by the host application 104 and the storage resources available for use by the host application 104 may actually be maintained by the compute nodes $116_1$-$116_4$ at non-contiguous addresses (tracks) on various different managed drives 132 on storage system 100.

In some embodiments, the storage system 100 maintains metadata that indicates, among various things, mappings between the production device 140 and the locations of extents of host application data in the virtual shared memory 138 and the managed drives 132. In response to an IO (Input/Output command) 146 from the host application 104 to the host device 142, the hypervisor/OS 112 determines whether the IO 146 can be serviced by accessing the host volatile memory 106. If that is not possible then the IO 146 is sent to one of the compute nodes 116 to be serviced by the storage system 100.

In the case where IO 146 is a read command, the storage system 100 uses metadata to locate the commanded data, e.g., in the virtual shared memory 138 or on managed drives 132. If the commanded data is not in the virtual shared memory 138, then the data is temporarily copied into the virtual shared memory 138 from the managed drives 132 and sent to the host application 104 by the front-end adapter 126 of one of the compute nodes $116_1$-$116_4$. In the case where the IO 146 is a write command, in some embodiments the storage system 100 copies a block being written into the virtual shared memory 138, marks the data as dirty, and creates new metadata that maps the address of the data on the production device 140 to a location to which the block is written on the managed drives 132.

As shown in FIG. 1, in some instances a host application 104 will become infected by ransomware 105. In other instances, the ransomware 105 will be a separate application on the host computer 102. In other instances, the ransomware 105 may exist on a separate computer or on the storage system 100. Regardless of the origin of the attack, ransomware will often operate to encrypt data stored on a storage volume such as the production device 140, to prevent the host application 104 from accessing the data stored on storage volume. To encrypt the data stored on storage volume, the ransomware 105 typically will read the data from the storage volume, run an encryption algorithm on the data, and then write the data back to the storage volume. Once the data has been encrypted, when the host application 104 issues a read operation on host device 142, the data that is returned by the storage system 100 will be encrypted with an encryption key used by the ransomware 105, such that the host application 104 is not able to decipher the data that was returned by the storage system 100.

To recover the original data, the host application 104 will need to access a different copy of the data, such as a backup copy, to enable the host application to resume operation. Depending on the type of attack, for example if the ransomware 105 has not been removed from the host 102, accessing the backup copy of the data can cause the backup copy to also be affected by the ransomware attack. One way to resolve the ransomware attack is for the host 102 to obtain access to a decryption key, to enable the host 102 to decrypt the data stored in storage volume, but this resolution is often undesirable since it often involves payment of money to the person who initiated the ransomware attack.

To minimize the amount of data affected by a ransomware attack, it is possible to implement ransomware detection on the primary R1 storage array. An example of this type of ransomware detection system is described in greater detail in U.S. patent application Ser. No. 17/578,574, entitled Method and Apparatus for Detecting the Occurrence of a Ransomware Attack on a Storage Volume, filed Jan. 22, 2022, the content of which is hereby incorporated herein by reference.

In addition to implementing ransomware detection, it is possible to protect data stored on a primary R1 storage array by having the primary R1 storage array mirror the data to one or more remote R2 storage arrays on a remote data replication facility. The primary storage array will also be referred to herein as the R1 array, and the remote storage array will be referred to herein as the R2 array. Although some embodiments are described in which the remote data replication facility is implemented using a single primary R1 storage array and a single remote R2 storage array, it should be understood that a given remote data replication facility may include multiple primary R1 storage arrays and multiple R2 storage arrays depending on the configuration of the remote data replication facility.

Remote Data Replication (RDR) facilities are referred to as either a synchronous remote data replication facility or as an asynchronous remote data replication facility, depending on the manner in which host write IO operations are handled by the primary R1 storage array on the remote data replication facility. In a synchronous remote data replication facility, data is written to the primary R1 storage array and mirrored by the primary R1 storage array to the remote R2 storage array, before the primary R1 storage array acknowledging the write IO to the host. In an asynchronous remote data replication facility, data is written to the primary R1 storage array, acknowledged by the primary R1 storage array to the host, and then subsequently written from the primary R1 storage array to the remote R2 storage array in an asynchronous manner. In either type of remote data replication facility, if a ransomware attacks the data on the primary R1 storage array, when the data is mirrored to the remote R2 storage array, it is possible for the corrupted data to be replicated to the remote R2 storage array, thus corrupting both copies of the user's data.

According to some embodiments, a ransomware protection system is implemented on a remote R2 storage array that is participating in an asynchronous remote data replication facility with a primary R1 storage array. The ransomware protection system 230 on the remote R2 storage array is configured to delay application of updates to the backup copy of data on the remote R2 storage array, and implement ransomware detection processes prior to application of the updates to the backup copy of data on the remote R2 storage array. In instances where ransomware activity is detected by the remote R2 storage array, the ransomware protection system 230 on the remote R2 storage array is configured to protect the backup copy of the host data on the remote R2 storage array, and generate an alert to notify a user that a possible ransomware attack has been detected. The user can then confirm whether particular activity on a storage volume 255 is legitimate or is related to ransomware activity. In instances where the ransomware attack is determined to be occurring, the corrupted data can be prevented from being applied to the backup copy of the data at the remote R2 storage array. The backup copy of the data is then able to be used to restore the host data on the primary R1 storage array, to enable the primary R1 storage array to recover from the ransomware attack. In instances where the ransomware attack is determined to not be occurring, the update is applied to the backup copy of the data at the remote R2 storage array and the asynchronous remote data replication facility continues.

As shown in FIG. 1, in some embodiments a storage array 100 will include an operating system 150, a data reduction system 170, a remote data replication system 175, a snapshot system 180, and a ransomware protection system 230. As described in greater detail herein, in some embodiments the ransomware protection system 230 is used when the storage system is the remote R2 storage array on an asynchronous remote data replication facility, to implement ransomware protection against ransomware attacks on data maintained by the primary R1 storage array.

Figure 2:
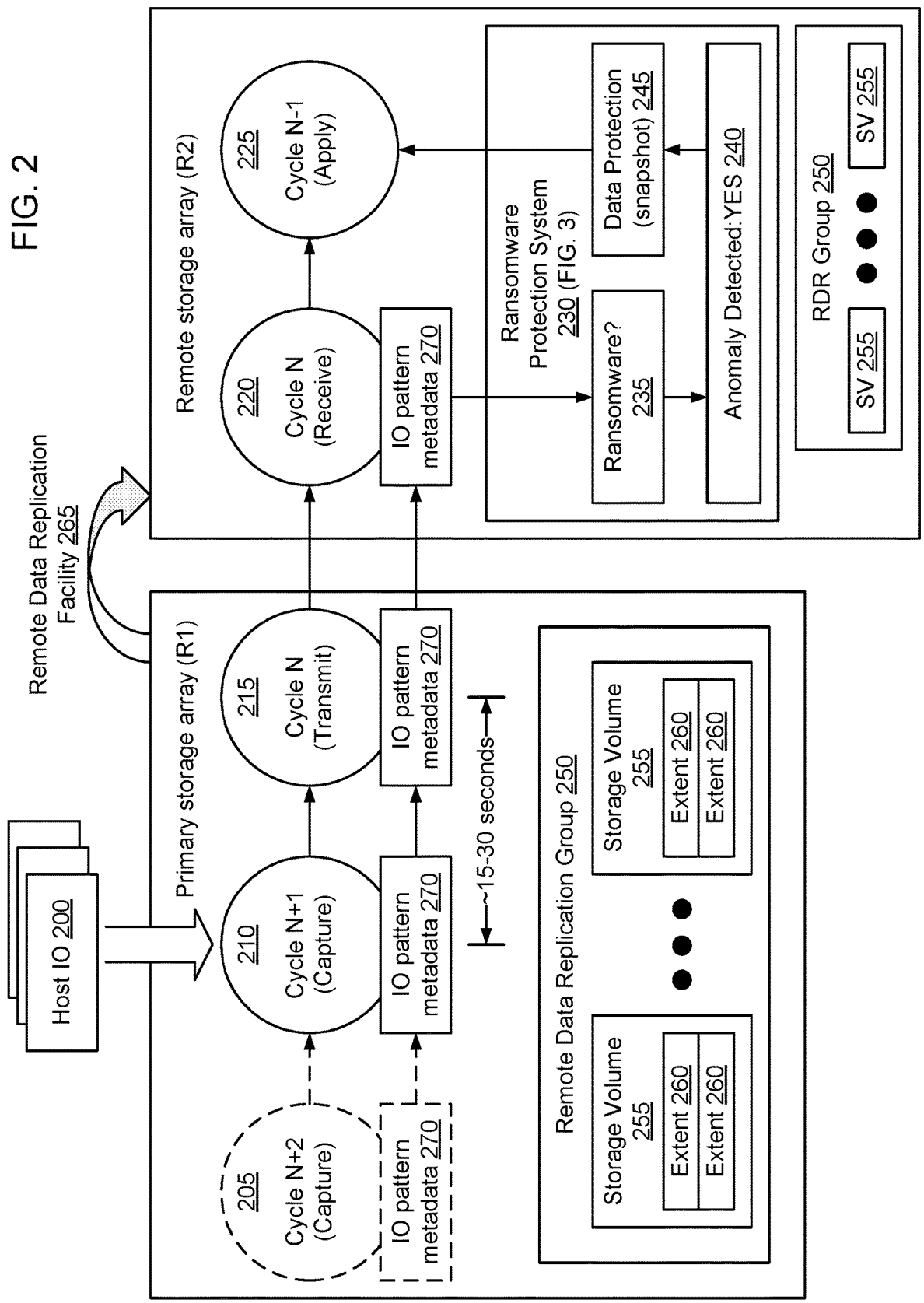
FIG. 2 is a functional block diagram of an example primary R1 storage array and remote R2 storage array implementing a remote data replication facility, in which ransomware activity detection is implemented by a ransomware protection system on the remote R2 storage array, according to some embodiments.

Remote data replication system 175, in some embodiments, is used to implement remote data replication facilities. An example remote data replication facility 265 is shown in greater detail in FIG. 2. As shown in FIG. 2, in a remote data replication facility, a set of storage volumes 255 that are included in a remote data replication group 250 are mirrored to a remote R2 storage array. The remote data replication group 250 may include multiple storage volumes 255, each of which has a plurality of tracks/extents 260. Host IO operations 200, including read operations and write operations, are implemented on the storage volumes 255 of the remote data replication group 250. When a write occurs on a particular extent 260, the extent is marked as dirty and copied on the remote data replication facility 265 to the remote R2 storage array. In instances where the remote data replication system 175 is implementing an asynchronous remote data replication facility 265 with the remote R2 storage array, the primary R1 storage array will capture write operations during a capture cycle 210, and then transmit the group of write operations to the remote R2 storage array during a transmit cycle 215. The capture cycle 210 may be on the order of 15-30 seconds, although other lengths of capture cycles 210 may be implemented as well, depending on the implementation.

As shown in FIG. 2, in some embodiments ransomware activity detection is implemented by a ransomware protection system 230 on the remote R2 storage array. Because host IO 200 read operations do not affect the content of the storage volumes 255, normally host read operations are not captured during the capture cycle 210. However, to enable the ransomware protection system 230 on the remote R2 storage array to use read patterns in connection with performing ransomware detection, in some embodiments read IO information is captured during the capture cycle 210 as part of IO pattern metadata 270. During the transmit cycle 215, this IO pattern metadata 270 is transmitted along with the write IOs to the remote R2 storage array. By transmitting IO pattern metadata 270, which includes information about read operations on extents 260 of storage volumes 255, as well as the order of the read operations relative to the write operations relative to one another, it is possible for the ransomware protection system 230 to evaluate both read and write patterns on the storage volume 255, to look for read/write patterns indicative of possible ransomware activity. In some embodiments, the IO pattern metadata also includes information about the size of the read IO operations.

At the remote R2 storage array, the remote R2 storage array implements a receive cycle 220 during which the changed extents 260 are received and during which the IO pattern metadata 270 is received. The updates to the host data (changed extents) are not directly applied to the storage volumes 255 of the remote data replication group 250 on the remote R2 storage array during the receive cycle, but rather are held in a temporary storage at the remote R2 storage array until the ransomware protection system 230 is able to evaluate whether it is possible that a ransomware attack is occurring (block 235). If ransomware is not detected (a determination of NO at blocks 235, 240), the received update is applied to the remote data replication group 250 during an apply cycle 225 at the remote R2 storage array. The process then ends at the remote R2 storage array until a subsequent update is received.

If an anomaly is detected in the received update 220 (a determination of YES at blocks 235, 240), the data of the remote data replication group 250 is protected (block 245). For example, a snapshot may be taken of each storage volume 255 of the host data stored in the remote data replication group 250 on the remote R2 storage array. Additionally, if the possibility of a ransomware attack is detected (a determination of YES at blocks 235, 240), the update received during the receive cycle 220 is not applied to the storage volumes 255 of the remote data replication group, until authorized by a user. For example, the ransomware protection system 230 may generate an alert of the possible ransomware attack that requires a user to inspect the data patterns and either confirm or deny that a ransomware attack has been occurring.

In instances where the ransomware attack is not occurring, the update that was received during the receive cycle 220 may be applied 225. In instances where the ransomware attack is confirmed, the user may take steps to recover data from the remote R2 storage array to the primary R1 storage array. This enables the user's good data that is stored on the remote R2 storage array to be used to go back and replace the data that was affected by the ransomware attack. In this way, instead of the bad data on the primary R1 storage array being populated to the remote R2 storage array on the remote data replication facility 265, the good data on the remote R2 storage array is able to be used to replace the corrupted data on the primary R1 storage array, to thus revert the storage volumes 255 of the remote data replication group 250 on the primary R1 storage array back to the state as the storage volumes existed at an earlier point in time (before the ransomware attack).

Figure 3:
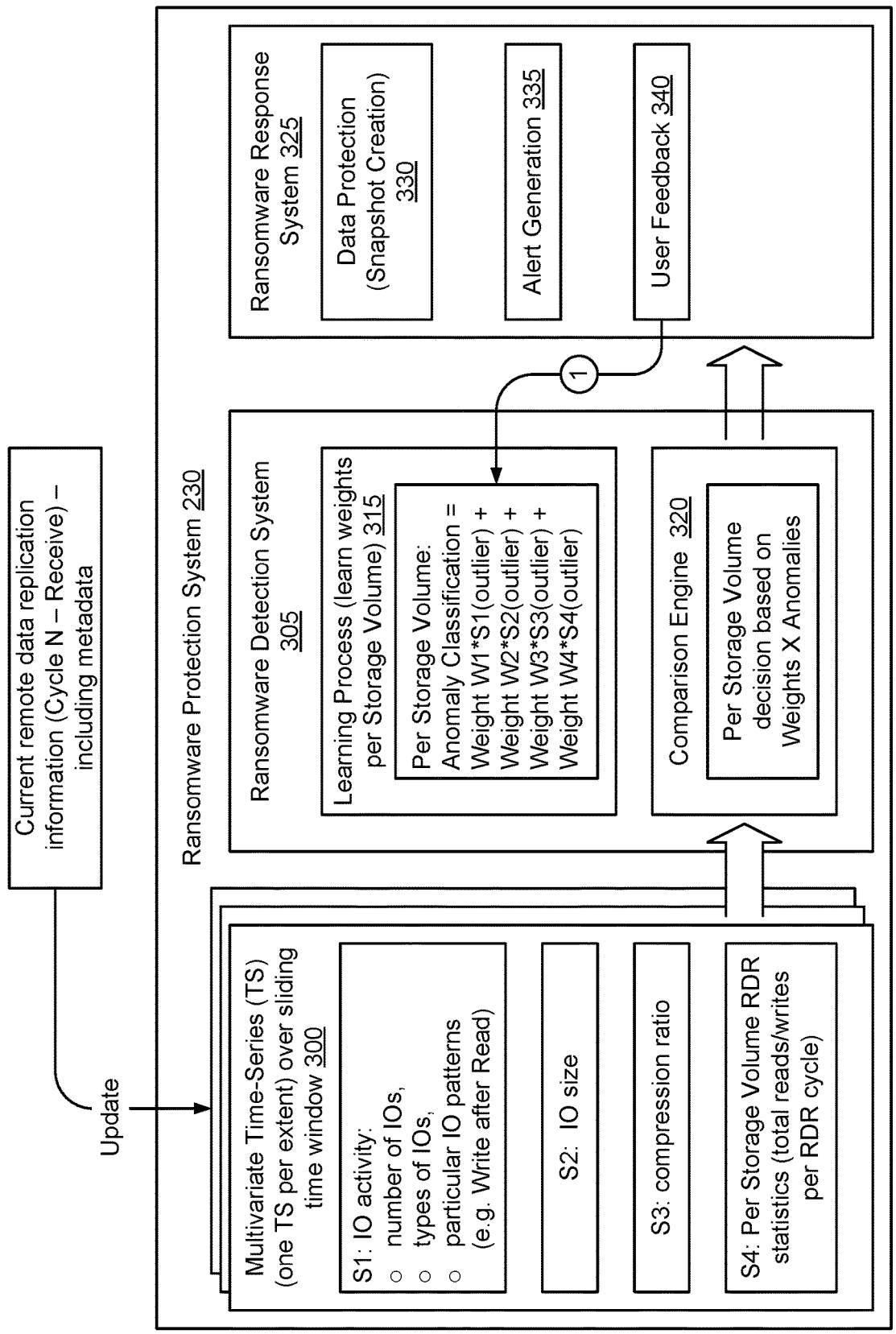
FIG. 3 is a functional block diagram of an example ransomware protection system, according to some embodiments.

FIG. 3 is a functional block diagram of an example ransomware protection system, according to some embodiments. As shown in FIG. 3, in some embodiments the ransomware protection system 230 maintains a separate multivariate time series 300 for each extent over a sliding time window, that enables the ransomware protection system 230 to characterize multiple statistics associated with access patterns on each extent 260 of each storage volume 255 of the remote data replication group 250. An example length of time of a sliding time window may be on the order of 10 minutes, although sliding time windows of other lengths may also be used depending on the implementation.

In FIG. 3, some embodiments are illustrated in which four statistics (S1-S4) are tracked over a sliding time window, to create the multivariate time series for each extent. For example, in FIG. 3 statistic S1 is used to keep track of IO activity on the extent. Example IO activity includes the number of read and write (IO) operations on the extent, the type of IO operations, and particular write patterns. Some ransomware attacks are implemented by reading an extent, encrypting the data contained in the extent using a secret encryption key, and then writing the data back to the extent. This type of IO pattern, referred to herein as write after read, is specifically tracked in some embodiments to look for write after read IO patterns of this nature. Some storage volumes may have frequent write after reads, while other storage volumes might never see this type of IO pattern. By maintaining statistics on this type of IO pattern, as one of the statistical parameters of the multivariate time series 300, a sharp increase in the number of write after read operations on a given extent 260 or set of extents of a storage volume 255 may indicate the onset of a ransomware attack.

In FIG. 3, statistic S2 is the size of the IO operation. In some embodiments, extents of data are a fixed size, such as 128 KB, although the particular size of the extent may vary depending on the implementation. Host IO operations, such as read and write operations, may be implemented on portions of extents, and accordingly may range in size over time. However, ransomware attacks often attempt to encrypt all of the data contained in each attacked extent, and accordingly the average IO size during a ransomware attack will often be much larger than the IO size during normal IO activity. According to some embodiments, the multivariate time series includes the IO size of both read and write operations as one of the statistical parameters of the multivariate time series, such that a sudden overall increase in IO size can be considered as one factor when making a determination that a ransomware attack is possible. It should be noted that large size IO read operations can also occur in other situations, such as in connection with backup operations, so in some embodiments a large increase in the size of IO read operations, without corresponding subsequent large size write back operations, may not be sufficient to trigger a determination of a possible ransomware attack.

In FIG. 3, statistic S3 is the compression ratio of the data that is stored in the extents 260 of the storage volumes 255 of the remote data replication group 250. Data compression, or more generically reducibility, is related to a comparison of the amount of data provided by the host in host IO operations 200 and the amount of disk space required to hold the host data. In some embodiments, a data reduction engine 170 (See FIG. 1) is used to compress data before the data is stored in back-end storage resources. However, depending on the implementation, data that has been encrypted might not compress as compactly as data that is unencrypted prior to storage. For example, when a ransomware attack is occurring, the ransomware application 105 will often issue read operations on host device 142, encrypt the data, and then write the data back to the host device 142. This changes the data that is stored on the storage volume 255, which can cause the amount the data can be reduced by the data reduction engine 170 to change significantly. Accordingly, in some embodiments, the percentage reducibility or compression ratio of the data of the storage volume 255 is used as one of the statistical parameters of the multivariate time series and is a factor used by the ransomware protection system 230 when evaluating whether an update cycle on the asynchronous remote data replication facility 265 contains the signature of a ransomware attack on the data maintained by the primary R1 storage array.

In FIG. 3, statistic S4 is the per storage volume Remote Data Replication statistics, such as the total number of reads and writes on the storage volume per capture cycle 210. As noted in connection with FIG. 2, in asynchronous remote data replication, the primary R1 storage array will capture all read and write operations on a given storage volume during a capture cycle, and then transmit the extents that were changed during the capture cycle to the remote R2 storage array to enable the changed data of the storage volume on the primary R1 storage array to be synchronized and used to update the storage volume on the backup storage array. Similarly, according to some embodiments, metadata describing the read operations on the storage volumes 255 of the remote data replication group 250 are captured and transmitted as metadata 270. A ransomware attack can target a particular storage volume 255 and, as such, a sharp increase in the number of read and/or write operations on the storage volume 255 can be one indication of the possible onset of a ransomware attack.

Each time an update is received at the remote R2 storage array, the update is used to update the multivariate time series 300 statistics S1-S4 for each extent and storage volume 255. The set of updated multivariate time series is used by a ransomware detection system 305 to detect the possibility of occurrence of a ransomware attack. For example, the multivariate time series 300, in some embodiments, are used to determine if the writes and metadata are outliers. In some embodiments, a drastic change in the IO size, number of write after read operations, a large change in compressibility, etc., when compared with expected values predicted based on the multivariate time series, is used to identify outliers that are indicative of occurrence of a potential ransomware attack.

In some embodiments, the ransomware detection system 305 includes a learning process 315 that is used to learn weights per storage volume that are used to classify the statistics of the multivariate time series 300 on a per storage volume basis. Different storage volumes might have different usage characteristics, and what might be considered an anomaly for some storage volumes might be normal for other storage volumes. To accommodate this, according to some embodiments the learning process 315 learns a set of weights (W1, W2, W3, and W4) that are applied to each of the statistics (S1, S2, S3, S4), and anomaly classification is implemented by applying the weights to the respective statistic outlier values, for a given receive cycle.

For example, in some embodiments, if a first storage volume has a relatively constant number of IOs over time, a sharp increase in the number of IOs on the first storage volume might be more indicative of a ransomware attack than if the same sharp increase were identified in a second storage volume that had a more erratic number of IOs over time. Accordingly, the weight W1 for the first storage volume might be learned to be a larger weight, to thus provide greater emphasis to that statistic for anomaly detection on the first storage volume. By contrast, the weight W2 for the second storage volume might be learned to be a lower weight, to thus provide less emphasis to that statistic for anomaly detection on the second storage volume. By learning the time series characteristics of each of the storage volumes, it is possible for the learning process 315 to derive weights for application to each of the statistics. When anomalies are encountered in the statistics S1-S4 of a given storage volume, the weights that have been derived for that storage volume enable the importance of the statistical anomaly to be included in the anomaly detection process, to thus individually adjust whether particular outlier values result in determination of an anomaly for a particular storage volume and, hence, an indication of a possible ransomware attack.

In some embodiments, the outlier values are computed by determining the current statistic values for a given receive cycle, and comparing the current statistic values with the multivariate time series values to identify a magnitude of a difference between the current statistic values and the values reported in the current receive cycle. For example, in some embodiments the magnitude of the outlier for each statistic is calculated by:

$$S_O = [(S_C - S_{TS})/S_{TS}] \times 100$$

where:
$S_C$ is the current statistic value derived from the current receive cycle;
$S_{TS}$ is the statistic value derived from the multivariate time series; and
$S_O$ is the statistical outlier value calculated as a percentage change of the current statistic value relative to the statistic value derived from the multivariate time series.

As shown in FIG. 3, in some embodiments where four statistic values S1, S2, S3, and S4 are used to perform anomaly detection, anomaly classification is based using an additive weighted statistical outlier value for the current receive cycle ($A_C$), that is computed as a sum of the respective weights W1, W2, W3, W4, times the respective statical outlier values $S1_O$, $S2_O$, $S3_O$, $S4_O$:

$$A_C = W1 * S1_O + W2 * S2_O + W3 * S3_O + W4 * S4_O$$

In some embodiments, the ransomware protection system 320 includes a comparison engine 320 that calculates the additive weighted statistical outlier value $A_C$ and compares the additive weighted statistical outlier value $A_C$ with a ransomware detection threshold. If the additive weighted statistical outlier value $A_C$ exceeds the threshold, the possibility of a ransomware attack is identified and a ransomware response system 325 is activated to take protective action in response to the possible ransomware attack.

In some embodiments, as shown in FIG. 3, the ransomware protection system 230 includes the ransomware response system 325, which includes a data protection system 330, an alert generation system 335, and a user feedback system 340. In some embodiments, the data protection system 330 is configured to cause a snapshot system 180 (See FIG. 1) on the remote R2 storage array to create a point-in-time copy of each of the storage volumes 225 of the remote data replication group 250 on the remote R2 storage array. By creating a point-in-time copy of the storage volumes 255, it is possible to ensure that the data that existed before the ransomware attack was detected is preserved, to thus prevent the ransomware attack from affecting data on both the primary R1 storage array and the remote R2 storage array.

Additionally, the alert generation system 335, in some embodiments, is configured to generate an alert to notify a system administrator of the possibility of occurrence of a ransomware attack. In some embodiments the alert generation system 335 identifies the remote data replication group 250, the storage volume 255, and the statistical outlier values S10, S20, S30, S40 that caused the comparison engine 320 to determine that a ransomware attack was possible. In response, the system administrator may provide feedback via the user feedback system 340 to specify that a ransomware attack is not in progress, or is in progress. In some embodiments, if the system administrator specifies via the user feedback system 340 that a ransomware attack is not occurring, the user feedback from the user feedback system 340 (FIG. 3, arrow 1) is used to train the learning process 315 to adjust the weights to reduce the occurrence of future false positive identifications.

Figure 4:
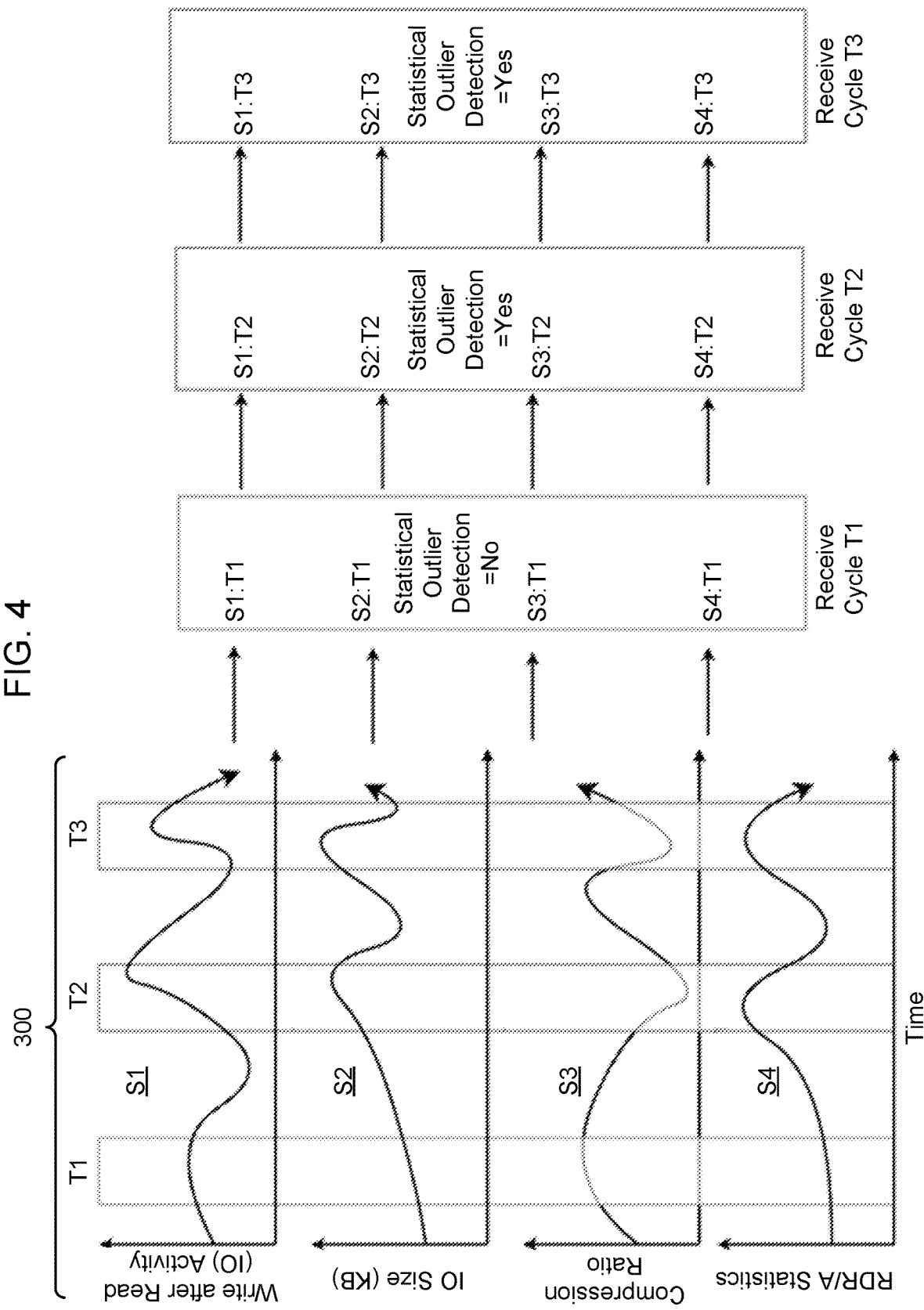
FIG. 4 is set of graphs visually depicting anomaly detection associated with possible ransomware activity implemented by an example ransomware protection system, according to some embodiments.

FIG. 4 is set of graphs visually depicting anomaly detection associated with possible ransomware activity implemented by an example ransomware protection system on a multivariate time series 300, according to some embodiments. In the example shown in FIG. 4, the multivariate time series includes four statistics (S1, S2, S3, and S4), in which statistic S1 is a measure of write after read IO activity, statistic S2 is a measure of the IO size (KB), statistic S3 is a measure of the compressibility of the data, and statistic S4 is a measure of the overall Remote Data Replication Asynchronous (RDR/A) activity statistics. Example RDR/A activity statistics might include a number of read and write operations to the set of extents of the set of storage volumes, overall numbers of read and write operations to a particular storage volume, or other remote data replication activity.

As shown in FIG. 4, during time T1 none of the monitored statistics are determined to be outside of a normal range and, as such, the ransomware detection system 305 determines that the additive weighted statistical outlier value for the current receive cycle ($A_C$), is not above the threshold. Namely, the statistical outlier detection process implemented by comparison engine 320 determines that the write operations and metadata 270 received during the current receive cycle at time T1 does not contain weighted statistical outlier(s) that would indicate the possibility of occurrence of a ransomware attack.

During times T2 and T3, by contrast, statistic S1 (write after read IO activity) shows a marked increase from the normal value shown at time T1, the IO size has similarly increased significantly, the compression ratio is significantly reduced, and the RDR/A statistics are higher. All four of these factors are indicative of the possible occurrence of a ransomware attack and, as such, the ransomware detection system 305 determines that the additive weighted statistical outlier value for the current receive cycle ($A_C$) during both the T2 receive cycle and the T3 receive cycle are above the threshold. Namely, the statistical outlier detection process implemented by comparison engine 320 determines that the write operations and metadata 270 received during the current receive cycle at times T2 and T3 both include statistical outliers that would indicate the possibility of occurrence of a ransomware attack.

Figure 5:
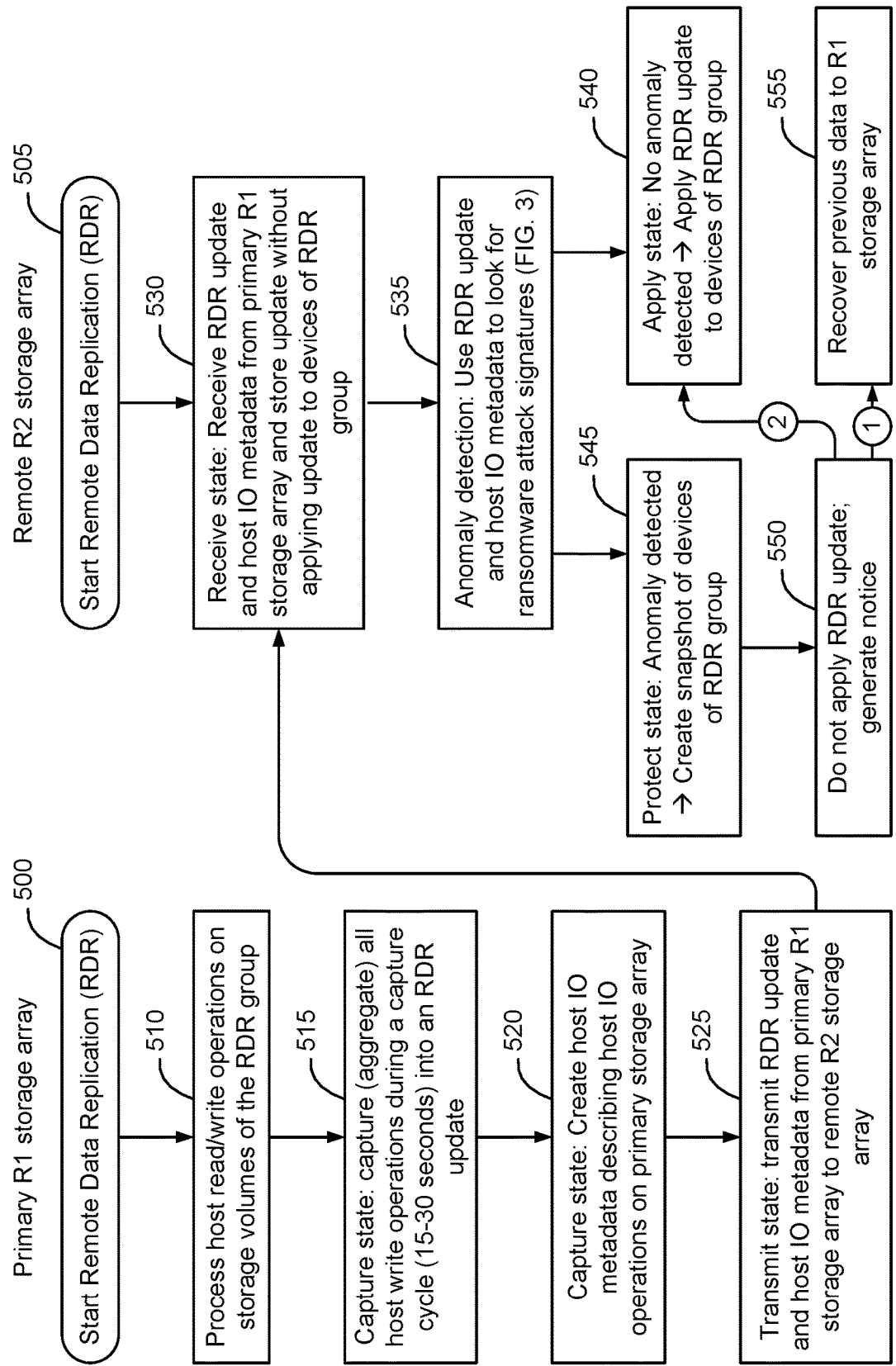
FIG. 5 is a flowchart of a method of implementing ransomware activity detection on a remote R2 storage array on an asynchronous remote data replication facility, according to some embodiments.

FIG. 5 is a flowchart of a method of implementing ransomware activity detection on a remote R2 storage array on an asynchronous remote data replication facility, according to some embodiments. As shown in FIG. 5, initially a remote data replication facility is started on the primary R1 storage array (block 500), and on the remote R2 storage array (block 505), in which data contained in a set of storage volumes 255 of a remote data replication group 250 on a primary R1 storage array are replicated to a remote R2 storage array.

After the remote data replication facility 265 is started, the primary R1 storage array will process host read and write operations on the storage volumes 255 of the remote data replication group 250 (block 510). During a capture state (FIG. 2, capture cycle 210), the primary R1 storage array will capture (aggregate) all host write operations on a set of storage volumes 255 (block 515). An example capture cycle may be on the order of 15-30 seconds, although capture cycles of other durations may be used as well. During the capture state (FIG. 2, capture cycle 210), the primary R1 storage array will also create host IO metadata 270 describing host IO operations on the primary R1 storage array (block 520). Importantly, the host IO metadata 270 includes information about host read IO operations, as well as host write IO operations, and in some embodiments includes information specifying the relative order of operation of the host read IO and write IO operations on the storage volumes 255 on the primary R1 storage array.

At the end of the capture state (FIG. 2, capture cycle 210), the primary R1 storage array enters transmit state (FIG. 2, transmit cycle 215) (block 525) during which the remote data replication update including all of the host write operations captured during the capture cycle (created in block 515) and host IO metadata 270 (created in block 520) are transmitted by the primary R1 storage array to the remote R2 storage array. The primary R1 storage array iteratively implements capture cycles and, at the end of each capture cycle 210, transmits the data to the remote R2 storage array during a corresponding transmit cycle 215. For example, as shown in FIG. 2, at the end of capture cycle N+1, cycle N+1 becomes the transmit cycle 215, and the primary storage array begins capture cycle N+2.

On the remote R2 storage array, the remote R2 storage array enters into a receive state (FIG. 2, receive cycle 220), in which the remote data replication update is received and stored temporarily (block 530). Notably, the remote data replication update is not applied to the storage volumes 255 of the remote data replication group 250 on the remote during the receive state (FIG. 2, receive cycle 220), but rather the received update is simply stored at the remote R2 storage array (block 530).

The remote R2 storage array implements an anomaly detection process (block 535) in which the write IOs contained in the remote data replication update and the host IO metadata are used by the ransomware detection system 305 to look for ransomware attack signatures. An example anomaly detection process is described in greater detail herein, for example in connection with FIG. 3, although other anomaly detection processes may be used as well, depending on the implementation. Accordingly, the anomaly detection process shown in FIG. 3 should be considered only one possible anomaly detection process and the particular anomaly detection process may vary depending on the implementation.

In response to a determination that the remote data replication update and host IO metadata does not indicate the likelihood of a ransomware attack, the remote R2 storage array enters into an apply state (FIG. 2, apply cycle 225), during which the stored remote data replication update is used to update the data contained in the extents 260 of the storage volumes 255 of the remote data replication group 250 on the remote R2 storage array (block 540).

In response to a determination that the remote data replication update and host IO metadata indicates the likelihood of a ransomware attack, the remote R2 storage array enters into a protect state (block 545), in which the data on the remote R2 storage array is protected, for example by creating a snapshot of each storage volume 255 of the remote data replication group 250 on the remote R2 storage array. The remote R2 storage array maintains the update in the temporary storage and does not apply the remote data replication update to the storage volumes (block 550). A storage system administrator is then notified and, optionally, in response to a determination by the system administrator that a ransomware attack occurred and was prevented by the ransomware protection system 230, the previous data may be recovered from the remote R2 storage array to the primary R1 storage array to undo at least a portion of the damage caused by the ransomware attack (block 555) (FIG. 5, arrow 1). In instances where it is determined by the system administrator that none of the host write operations are likely associated with ransomware activity, the host write operations contained in the remote data replication update are applied to the second set of storage volumes implementing the backup copy of the data at the remote R2 storage array (block 540) (FIG. 5, arrow 2).

The methods described herein may be implemented as software configured to be executed in control logic such as contained in a CPU (Central Processing Unit) or GPU (Graphics Processing Unit) of an electronic device such as a computer. In particular, the functions described herein may be implemented as sets of program instructions stored on a non-transitory tangible computer readable storage medium. The program instructions may be implemented utilizing programming techniques known to those of ordinary skill in the art. Program instructions may be stored in a computer readable memory within the computer or loaded onto the computer and executed on computer's microprocessor. However, it will be apparent to a skilled artisan that all logic described herein can be embodied using discrete components, integrated circuitry, programmable logic used in conjunction with a programmable logic device such as a FPGA (Field Programmable Gate Array) or microprocessor, or any other device including any combination thereof. Programmable logic can be fixed temporarily or permanently in a tangible non-transitory computer readable medium such as random-access memory, a computer memory, a disk drive, or other storage medium. All such embodiments are intended to fall within the scope of the present invention.

Throughout the entirety of the present disclosure, use of the articles "a" or "an" to modify a noun may be understood to be used for convenience and to include one, or more than one of the modified noun, unless otherwise specifically stated. The term "about" is used to indicate that a value includes the standard level of error for the device or method being employed to determine the value. The use of the term "or" in the claims is used to mean "and/or" unless explicitly indicated to refer to alternatives only or the alternatives are mutually exclusive, although the disclosure supports a definition that refers to only alternatives and to "and/or." The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and also covers other unlisted steps.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Various changes and modifications of the embodiments shown in the drawings and described in the specification may be made within the spirit and scope of the present invention. Accordingly, it is intended that all matter contained in the above description and shown in the accompanying drawings be interpreted in an illustrative and not in a limiting sense. The invention is limited only as defined in the following claims and the equivalents thereto.

What is claimed is:

1. A method of detecting ransomware activity, comprising: implementing an asynchronous remote data replication facility between a primary storage array and a remote storage array, in which data contained in a first set of storage volumes of a first remote data replication storage group at the primary storage array is copied in an asynchronous manner from the primary storage array to the remote storage array to replicate the data in a second set of storage volumes of a second remote data replication storage group at the remote storage array; receiving host read and write operations on the first set of storage volumes by the primary storage array during a capture cycle; generating a remote data replication update including all of the host write operations on the first set of storage volumes during the capture cycle; generating a host input/output (IO) metadata update describing all of the host write operations and all of the host read operations on the first set of storage volumes during the capture cycle; transmitting the remote data replication update and the host IO metadata update at the end of the capture cycle to the remote storage array; receiving the remote data replication update and the host IO metadata update during a receive cycle at the remote storage array; temporarily storing the remote data replication update without applying any of the host write operations contained in the remote data replication update to the second set of storage volumes; and while temporarily storing the remote data replication update, performing ransomware anomaly detection using the remote data replication update and the host IO metadata update to determine when any of the host write operations are likely associated with ransomware activity; in response to a determination that one or more of the host write operations is likely associated with ransomware activity, protecting the data contained in the second set of storage volumes; and in response to a determination that none of the host write operations are likely associated with ransomware activity, applying the host write operations contained in the remote data replication update to the second set of storage volumes.

2. The method of claim 1, wherein protecting the data contained in the second set of storage volumes comprises creating a point-in-time copy of each storage volume of the second set of storage volumes.

3. The method of claim 2, wherein protecting the data contained in the second set of storage volumes comprises not applying the host write operations contained in the remote data replication update to the second set of storage volumes.

4. The method of claim 1, wherein protecting the data contained in the second set of storage volumes comprises: not applying the host write operations contained in the remote data replication update to the second set of storage volumes; generating a notification indicating that the ransomware anomaly detection identified one or more of the host write operations as likely associated with ransomware activity; and waiting for a response containing a determination that the one or more of the host write operations is actually associated with ransomware activity or is not actually associated with ransomware activity.

5. The method of claim 4, in response to a determination that the one or more of the host write operations is actually associated with ransomware activity, restoring data from the second set of storage volumes to the first set of storage volumes.

6. The method of claim 4, in response to a determination that the one or more of the host write operations is not actually associated with ransomware activity, applying the host write operations contained in the remote data replication update to the second set of storage volumes.

7. The method of claim 1, wherein performing ransomware anomaly detection using the remote data replication update and the host IO metadata update is implemented at the remote storage array to determine by the remote storage array when any of the host write operations are likely associated with ransomware activity prior to applying the remote data replication update to the second set of storage volumes on the remote storage array.

8. The method of claim 7, wherein the host IO metadata update includes information describing the size of the host read operations.

9. The method of claim 8, wherein the host IO metadata update includes IO pattern metadata describing an order of the host read operations relative to the host write operations.

10. The method of claim 1, wherein performing ransomware anomaly detection on the remote storage array comprises, for each extent of each of the second set of storage volumes: creating a multivariate time series for the extent including data values for a plurality of statistics over a preceding time window; creating a current set of data values for the plurality of statistics from the remote data replication update and the host IO metadata update; determining current outlier values by comparing the current set of data values with predicted data values generated from the multivariate time series; weighting the current outlier values to create weighted current outlier values; combining the weighted current outlier values; and determining from the combined weighted current outlier values when the host write operations and host read operations on the extent are likely associated with ransomware activity.

11. A system for detecting ransomware activity, comprising: one or more processors and one or more storage devices storing instructions that are operable, when executed by the one or more processors, to cause the one or more processors to perform operations comprising: implementing an asynchronous remote data replication facility between a primary storage array and a remote storage array, in which data contained in a first set of storage volumes of a first remote data replication storage group at the primary storage array is copied in an asynchronous manner from the primary storage array to the remote storage array to replicate the data in a second set of storage volumes of a second remote data replication storage group at the remote storage array; receiving host read and write operations on the first set of storage volumes by the primary storage array during a capture cycle; generating a remote data replication update including all of the host write operations on the first set of storage volumes during the capture cycle; generating a host IO metadata update describing all of the host write operations and all of the host read operations on the first set of storage volumes during the capture cycle; transmitting the remote data replication update and the host IO metadata update at the end of the capture cycle to the remote storage array; receiving the remote data replication update and the host IO metadata update during a receive cycle at the remote storage array; temporarily storing the remote data replication update without applying any of the host write operations contained in the remote data replication update to the second set of storage volumes; and while temporarily storing the remote data replication update, performing ransomware anomaly detection using the remote data replication update and the host IO metadata update to determine when any of the host write operations are likely associated with ransomware activity; in response to a determination that one or more of the host write operations is likely associated with ransomware activity, protecting the data contained in the second set of storage volumes; and in response to a determination that none of the host write operations are likely associated with ransomware activity, applying the host write operations contained in the remote data replication update to the second set of storage volumes.

12. The system of claim 11, wherein protecting the data contained in the second set of storage volumes comprises creating a point-in-time copy of each storage volume of the second set of storage volumes.

13. The system of claim 12, wherein protecting the data contained in the second set of storage volumes comprises not applying the host write operations contained in the remote data replication update to the second set of storage volumes.

14. The system of claim 11, wherein protecting the data contained in the second set of storage volumes comprises: not applying the host write operations contained in the remote data replication update to the second set of storage volumes; generating a notification indicating that the ransomware anomaly detection identified one or more of the host write operations as when likely associated with ransomware activity; and waiting for a response containing a determination that the one or more of the host write operations is actually associated with ransomware activity or is not actually associated with ransomware activity.

15. The system of claim 14, in response to a determination that the one or more of the host write operations is actually associated with ransomware activity, restoring data from the second set of storage volumes to the first set of storage volumes.

16. The system of claim 14, in response to a determination that the one or more of the host write operations is not actually associated with ransomware activity, applying the host write operations contained in the remote data replication update to the second set of storage volumes.

17. The system of claim 11, wherein performing ransomware anomaly detection using the remote data replication update and the host IO metadata update is implemented at the remote storage array to determine by the remote storage array when any of the host write operations are likely associated with ransomware activity prior to applying the remote data replication update to the second set of storage volumes on the remote storage array.

18. The system of claim 17, wherein the host IO metadata update includes information describing the size of the host read operations.

19. The system of claim 18, wherein the host IO metadata update includes IO pattern metadata describing an order of the host read operations relative to the host write operations.

20. The system of claim 11, wherein performing ransomware anomaly detection on the remote storage array comprises, for each extent of each of the second set of storage volumes: creating a multivariate time series for the extent including data values for a plurality of statistics over a preceding time window; creating a current set of data values for the plurality of statistics from the remote data replication update and the host IO metadata update; determining current outlier values by comparing the current set of data values with predicted data values generated from the multivariate time series; weighting the current outlier values to create weighted current outlier values; combining the weighted current outlier values; and determining from the combined weighted current outlier values when the host write operations and host read operations on the extent are likely associated with ransomware activity.

* * * * *